United States Patent [19]

Cheng

[11] Patent Number: 5,448,892
[45] Date of Patent: Sep. 12, 1995

[54] METHODS AND APPARATUSES FOR PROVIDING COOL THERMAL STORAGE AND/OR WATER PURIFICATION

[76] Inventor: Chen-Yen Cheng, 10308 Padington Ct., Ellicott City, Md. 21042

[21] Appl. No.: 945,651
[22] PCT Filed: Apr. 29, 1991
[86] PCT No.: PCT/US91/02964
  § 371 Date: Oct. 27, 1992
  § 102(e) Date: Oct. 27, 1992
[51] Int. Cl.[6] .................................. F25J 5/00
[52] U.S. Cl. ................................ 62/12; 62/532
[58] Field of Search ............................. 62/12, 532

[56] References Cited

U.S. PATENT DOCUMENTS 4,810,274 3/1989 Cheng et al. .................... 62/12

*Primary Examiner*—Ronald G. Capossela

[57] ABSTRACT

The methods and apparatuses of the present invention are to be used in providing systems for cool thermal storage. Some of the systems can also be used to accomplish purification of dilute solutions. Three working mediums are used. These mediums are: (a) a primary cool storage medium that undergoes solidification and liquefaction operations, (b) a final heat interaction medium that is used to provide air conditioning and (c) an intermediate heat interaction medium that undergoes vaporization and condensation operations to enhance heat interactions. During a charging period, the intermediate medium is vaporized to remove heat from the primary medium to thereby produce a first vapor of the intermediate medium and solidify the primary medium, and the first vapor is condensed by removing heat from it. During a discharging period, a mass of the intermediate medium is vaporized to remove heat from a mass of the final medium, to thereby produce a mass of second vapor and a mass of chilled final medium, and the second vapor is condensed to liquefy the primary medium solid.

38 Claims, 7 Drawing Sheets

METHODS AND APPARATUSES FOR PROVIDING COOL THERMAL STORAGE AND/OR WATER PURIFICATION

BACKGROUND OF THE INVENTION

1. Field of the Invention (Technical Field)

The methods and apparatuses of the present invention are to be used in providing systems for cool thermal storage, either long term storage such as seasonal storage or short term storage such as day by day storage. Some of the systems can also be used to accomplish purification of dilute aqueous and non-aqueous solutions.

The current market for cool thermal storage is created by electric utilities. The benefits derived by the utility may include increased revenue, lower cost production, or shifting summer demand. Electric utilities supplement persuasive marketing programs with attractive utility rates to sell the cool thermal storage concept. Many utilities will contribute cash rebates on the basis of "Avoided demand" for thermal storage systems.

Electric utilities generate power from several different energy sources with energy cost ranging from low cost hydro and nuclear to expensive gas turbines. Many lower energy cost nuclear and hydro plants have excess capacity during off-peak hours (typically 9 pm to 9 am), while the cost of operating gas turbines for peaking often exceeds revenue from the power they generate. Lowering on-peak daytime demand and increasing off-peak nighttime demand enhances utility profitability. Load management just makes good economic sense. Cool thermal storage contributes to improved load management. The capital cost of cool thermal storage systems can be offset by utility savings passed on to the owner. The vehicle to pass on savings may be high daytime demand charges that are waived during off-peak hours, discounts for off-peak power or cash rebates for comfort systems that move the power requirements from on-peak hours to off-peak hours.

A system of the present invention may serve as a dural purpose system for cool storage and water purification. It is particularly effective in treating dilute solutions. Polluted waters containing toxic pollutants in low concentrations are produced from various sources, such as underground waters, industrial waste waters and nuclear waste waters. Such waste water can be treated to produce usable water. A dual purpose system has tremendous advantages over conventional cool storage systems and conventional water purification systems.

2. Background Art

Since a dual purpose system of the present invention can provide both cool thermal storage and water purification, prior art on cool thermal storage and water purification by vacuum freezing are reviewed in the following:

Cool Thermal Storage

Chilled water, ice, or other phase change materials can be used as a cool storage medium. Prior art on chilled water storage, ice storage and eutectic hydrate salt storage is outlined.

Chilled Water Storage

Conceptually, chilled water storage appears to be a simple design. Water stores heat by increasing its temperature. The specific heat of water is one Btu per degree Fahrenheit per pound. 12000 degree Fahrenheit pounds are required to store one tonhour of cooling. Chilled water storage is traditionally designed on a 20 degree Fahrenheit temperature rise, which equates to almost 10 cubic feet of water per tonhour. Chillers have very little difficulty cooling water to the minimum design temperature, typically 40° F.

Chilled water at around 4.5° C. (40.1° F.) may be produced by absorption refrigeration or mechanical compression refrigeration. Major manufacturers of absorption refrigeration machines are Carrier Corporation of Syracuse, New York and Trane Company of Le Crosse, Wis. Major manufacturers of mechanical compression water chillers are York Company of York Pennsylvania and Trane Company of Le Crosse, Wis. An absorption chiller usually uses a lithium bromide-water mixture as the working medium. A mechanical chiller uses a centrifugal compressor, screw compressor or reciprocating compressor and Freon as the refrigerant.

Ice Storage

The latent heat of fusion or the heat absorbed by one pound of ice when it melts is 144 Btu. This equates to less than 1.5 cubic feet of ice per tonhour. There are three types of conventional systems of ice storage. These three types are: (a) static ice storage, (b) dynamic ice storage and (c) slush ice storage. It will be shown that the present invention introduces several new types of ice storage systems.

Static Ice Storage Systems

In a static ice storage system, ice is made on tubes by an indirect freezing operation and is melted in place by circulating water to thereby produce chilled water for air conditioning. The volume of ice must be permeated with channels of fluid to transport heat into and out of the body ice. The fluid in the pipe can be brine or refrigerant. Brine systems use ethylene glycol to transport heat into and out of the ice. Refrigerant systems circulate refrigerant through the pipe to remove heat from the tank, but circulate water through the pipe or through the free area around the ice when adding heat to the tank.

A major manufacturer of static ice storage systems is CALMAC Manufacturing Corporation of Englewood, N.J. CALMAC Corporation uses water chillers manufactured by Trane Company in its ice storage systems.

Dynamic Ice Storage Systems

In a dynamic ice storage system, ice is produced by a flake ice machine and flake ice is stored in a vessel stream of circulating water is brought in contact with flake ice to be chilled and returned for cooling process equipment or a building. Major manufacturers of dynamic ice storage systems are Turbo Company of Denton, Tex. and Mueller Company in Springfield, Mo.

Slushy Ice Storage Systems

In a slushy ice storage system, a slushy ice mixture is formed by an indirect freezing operation. A mass of slushy ice may be directly circulated for air conditioning or a water stream may be chilled by the slushy ice and used for air conditioning. Developers of slushy ice systems are Chicago Bridge and Iron Company in Chicago, Ill. and Sunwell Engineering Company in Canada.

Eutectic Mixtures of Hydrate Salts

Eutectic mixtures of hydrate salts that solidify and melt in the range of 5° C. to 15° C. (41° F. to 59° F.) have been used to provide cool storage. A hydrate crystal has host molecules with many molecules of water around each host molecule. For example, Dow Chemical Co. has introduced a mixture based on calcium chloride hexahydrate and calcium bromide hexahydrate. The mixture has a transition temperature around 14° C. (58° F.). A eutectic mixture of hydrates can be used to store coolness at a temperature higher than an ice storage system and therefore saves energy. Transphase Systems, Inc. of Huntington Beach, Calif. is a major supplier of eutectic cool storage systems.

Vacuum Freezing Processes

Referring to the processing of an aqueous solution by any vacuum freezing process, the aqueous solution is introduced into a chamber which is maintained at a pressure that is somewhat lower than the vapor pressure of the solution at the freezing temperature of the solution to thereby simultaneously flash vaporize water and form ice crystals. This operation is referred to as S/L/V multiple phase transformation in a vacuum freezing process. As the result of this operation, a low pressure water vapor, referred to as a first vapor, and an ice-mother liquor slurry, referred to as a first condensed mass, are formed. In the case of sea water desalination, this pressure is around 3.5 torr. The low pressure water vapor formed has to be removed and transformed into a condensed state; the ice crystals have to be separated from the mother liquor; the resulting purified ice has to be melted to yield fresh water. Furthermore, the heat released in transforming the vapor into a condensed state has to be utilized in supplying the heat needed in melting the ice. The processes to be described utilize different ways of vapor removal and different ways of accomplishing the heat reuse.

Several vacuum freezing processes have been introduced by workers in the desalination field. These processes are (1) Vacuum Freezing Vapor Compression (VFVC) Process, developed by Colt Industries, and described in the Office of Saline Water, Research and Development Report No. 295, (2) Vacuum Freezing Vapor Absorption (VFVA) Process, developed by Carrier Corporation, and described in the Office of Saline Water, Research and Development Report No. 113, (3) Vacuum Freezing Ejector Absorption (VFEA) Process, developed by Colt Industries, and described in the Office of Saline Water, Research and Development Report No. 744, (4) Vacuum Freezing Solid Condensation (VFSC) Process developed in the Catholic University of America, and described in the Office of Saline Water, Research and Development Report No. 511, (5) Absorption Freezing Vapor Compression (AFVC) Process, introduced by Concentration Specialists, Inc., and described in the report submitted to the Office of Saline Water, (6) Vacuum Freezing High Pressure Ice Melting (VFPIM), introduced by Chen-Yen Cheng and Sing-Wang Cheng, and described in U.S. Pat. No. 4,236,382 and (7) Vacuum Freezing Multiple Phase Transformation Process, also introduced by Chen-Yen Cheng and Sing-Wang Cheng and described in U.S. Pat. No. 4,505,728.

SUMMARY OF THE INVENTION

DISCLOSURE OF THE INVENTION

The methods and apparatuses of the present invention are to be used in providing systems for cool thermal storage, for both long term storage such as seasonal storage as well as short term storage such as day by day storage. Some of the systems can also be used to accomplish purification of dilute solutions.

Functionally, there are three working mediums used in a cool storage system of the present invention. These mediums are (a) a primary cool storage medium, also denoted as a primary medium or Medium A, that undergoes solidification and liquefaction operations, (b) a final heat interaction medium, also denoted as a final medium or Medium B, that is used to provide process cooling and air conditioning and (c) an intermediate heat interaction medium also denoted as an intermediate medium or Medium C, that undergoes vaporization and condensation operations. During a charging period, the intermediate medium is vaporized to remove heat from the primary medium to thereby produce a first vapor of the intermediate medium and a mass of primary medium solid, and the first vapor is condensed by removing heat from it. During a discharging period, a mass of the intermediate medium is vaporized to remove heat from a mass of the final medium at a high energy state to thereby produce a mass of second vapor and a mass of the final medium at a low energy state, and the second vapor is condensed to supply heat to the primary medium to thereby liquefy the primary medium solid. A working medium may serve a single function, double functions or even triple functions. Thus, water may be used to serve only as a primary medium; water may serve both as a primary and an intermediate medium; water may serve as a primary medium and a final medium; water may serve as a primary medium, an intermediate medium and a final medium simultaneously.

The interaction between the primary medium and the intermediate medium may either be by direct contact interaction or by an indirect contact interaction. The interaction between the intermediate medium and the final medium may also be by a direct contact interaction or by an indirect contact interaction.

Systems of the present invention may be classified into many classes according to the primary medium used, the intermediate medium used, the final medium used, the mode of interaction between the primary medium and the intermediate medium and the mode of interaction between the intermediate medium and the final medium. Class 1 through Class 8 systems are presented. A direct contact interaction takes place between the primary medium and intermediate medium in each of the Class 1, Class 2, Class 3 and Class 4 systems; an indirect contact interaction takes place between the primary medium and intermediate medium in each of the Class 5, Class 6, class 7 and Class 8 systems.

A system of the present invention has the following advantages over a conventional cool storage system:

(1) The refrigerant used is vaporized at a substantially higher temperature, leading to a very substantial energy saving;

(2) A nearly complete solidification of the primary medium can be attained at the end of a charging period;

(3) A nearly complete liquefaction of the primary medium solid can be attained at the end of a discharging period;

(4) The equipment cost is substantially lower.

A class 1 system is a single purpose ice storage system in which water is used as the primary medium, the intermediate medium and the final medium and heat transfer between the primary medium and the intermediate medium is by direct contact heat transfer. A Class 1 system comprises three major processing zones: a first processing zone (Z-1), a second processing zone (Z-2) and a third processing zone (Z-3). The first processing zone is compartmentized into a multitude of thin compartments, each storing a mass of water and is provided with vapor passages so that each thin compartment is in vapor communication with the second and third processing zones. Each thin layer of water in Zone 1 may be retained on a shallow tray or be retained inside of a sponge by capillary force. The second processing zone is a zone in which a first vapor, $V_{12}$, whose pressure is lower than the triple point pressure of water, is transformed into a condensed mass. The third processing zone is a zone in which a water stream $M_{03}$ is flash vaporized to form a second vapor whose pressure is higher than the triple point pressure of water and a chilled water stream, $M_{30}$.

The system is operated cyclically and each cycle has a charging period and a discharging period. During a charging period, the pressure in the first processing zone is reduced below the triple point pressure to thereby generate a first vapor and produce a mass of ice in-situ. The ice formed in each thin compartment is stored within the compartment in which it is formed. The pressure in the zone is maintained by transferring vapor to the second processing zone. The first vapor is a sub-triple point vapor and is transformed into a condensed phase mass, such as a solid mass, by desublimation, or a liquid mass by compression followed by condensation, by two stage liquefaction or by absorption. During a discharging period, a stream of water to be chilled $M_{03}$ is introduced into the third processing zone and is flash vaporized to form a second vapor, $V_{31}$, whose pressure is somewhat higher than the triple point pressure of water and produce a stream of chilled water. The chilled water is used for process cooling including building cooling. The second vapor flows into the first processing zone to melt the ice in-situ. In a hermetically sealed system, one may use an internal water stream and an external water stream with an indirect heat transfer between the two streams.

A Class 2 system is a dual purpose system which accomplishes cool storage and water purification simultaneously. In this system, water is also used for the primary, intermediate and final mediums and the heat transfer between the primary and intermediate mediums is by direct contact heat transfer. The construction and operation of a Class 2 system are different from those of a Class 1 system as follows:
  (1) Vertical plates or slanted plates are placed with close spacing in zone 1.
  (2) During a charging period, water to be treated is applied on each plate as a thin liquid film. Simultaneous vaporization and solidification cause formation of a first vapor and a mass of smooth ice.
  (3) During a discharging period, second vapor gets in contact with the smooth ice deposit to melt it and thereby produce purified water.

It is noted that a Class 2 system has great economical advantage, because the equipment provides cool storage for process cooling and air conditioning and produces purified water at the same time.

A Class 3 system is a single purpose eutectic hydrate salts storage system in which an aqueous solution containing one or more hydrate forming salts is used as the primary medium and the heat transfer between the primary medium and the intermediate medium is by direct heat transfer. The construction and operations of a Class 3 system is similar to those of a Class 1 system except for the following:
  (a) A mixture of water and one or more hydrate-forming salts is placed in each thin compartment;
  (b) A mass of hydrate crystals is formed and decomposed during a charging period and a discharging period, respectively;
  (c) The first vapor may either be a super-triple point vapor or a sub-triple point vapor whose pressures are respectively higher or lower than the triple point pressure of water.

A Class 4 system is a single purpose ice storage system in which an aqueous solution containing one or more volatile solutes such as methanol, ethanol, propanol and acetone is used as the primary medium and the heat transfer between the primary medium and the intermediate medium is also by direct contact heat transfer. The construction and operations of a Class 4 system is similar to those of the Class 1 system except for the following:
  (a) An aqueous mixture containing one or more volatile solutes such as methanol, ethanol, propanol and acetone is placed in each thin compartment;
  (b) A first vapor containing water and the volatile solutes is formed to cause formation of ice during a charging period;
  (c) The first vapor is condensed to form a liquid mass by a single step condensation operation.

In a Class 5 system, the primary medium is water and the intermediate medium is a low vapor pressure refrigerant such as methanol, ethanol, propanol and acetone. The two mediums are separated by a flexible partition such as a polymer film and the outer surface of the partition is wetted by the intermediate medium by a wicking action or by a spraying action. The first vapor generated during a charging period is a vapor of the low vapor pressure refrigerant which is transformed into a liquid mass by a simple condensation operation. A low vapor pressure refrigerant is a refrigerant whose vapor pressure is so low that its vapor cannot be compressed directly by a commercially available compressor. The vapor is therefor condensed by using a separate refrigeration loop.

In a Class 6 system, the primary medium is a aqueous solution containing one or more hydrate forming solutes such as calcium chloride, calcium bromide, sodium sulfate and magnesium chloride, and the intermediate medium is a low vapor pressure refrigerant such as water, methanol, ethanol and propanol. The system is similar to that of a Class 5 system. When water is used as the intermediate medium, the first vapor formed is a super triple point vapor that is transformed into a liquid mass by a simple condensation operation.

In a Class 7 system, the primary medium used is an organic substance with a proper melting point or a melting range and the intermediate medium is a low vapor pressure refrigerant such as water. The construction and operations of this system are similar to those of Class 5 and Class 6 systems.

In a Class 8 system, the primary medium is any of the substances described and the intermediate medium is a high vapor pressure refrigerant, such as any commercial refrigerant used in commercial ice making machines. The first vapor can be compressed directly and the compressed vapor be condensed near the ambient temperature and the liquid refrigerant be returned to the first interaction zone of the system.

Figure 1B:
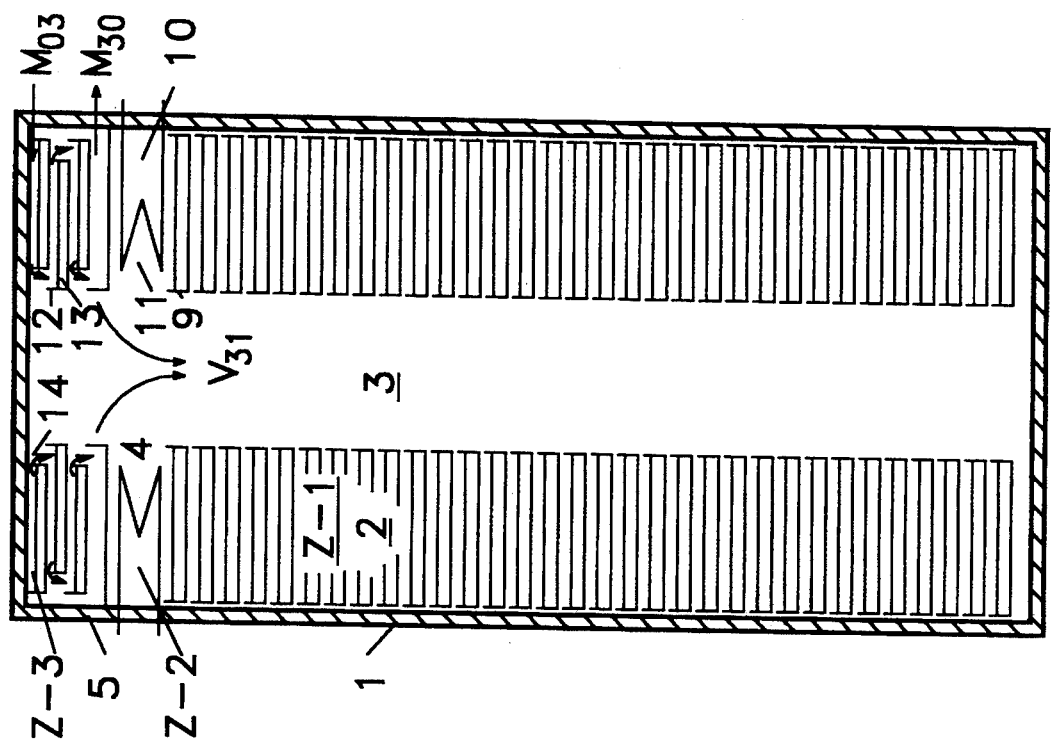
FIG. 1A and 1B respectively illustrate a Class 1 system during a charging period and a discharging period. There are a first processing zone (Zone 1), a second processing zone (Zone 2) and a third processing zone (Zone 3). There are thin compartments in Zone 1 retaining a layer of water. During a charging period, each thin layer of water is transformed into a first vapor and ice; the first vapor is transformed into a condensed mass in Zone 2. During a discharging period, a mass of water is flash vaporized in Zone 3 to form a second vapor and a mass of chilled water; the second vapor is brought in contact with ice in Zone 1 to melt the ice. The chilled water is used for process cooling or air conditioning.
Figure 1A:
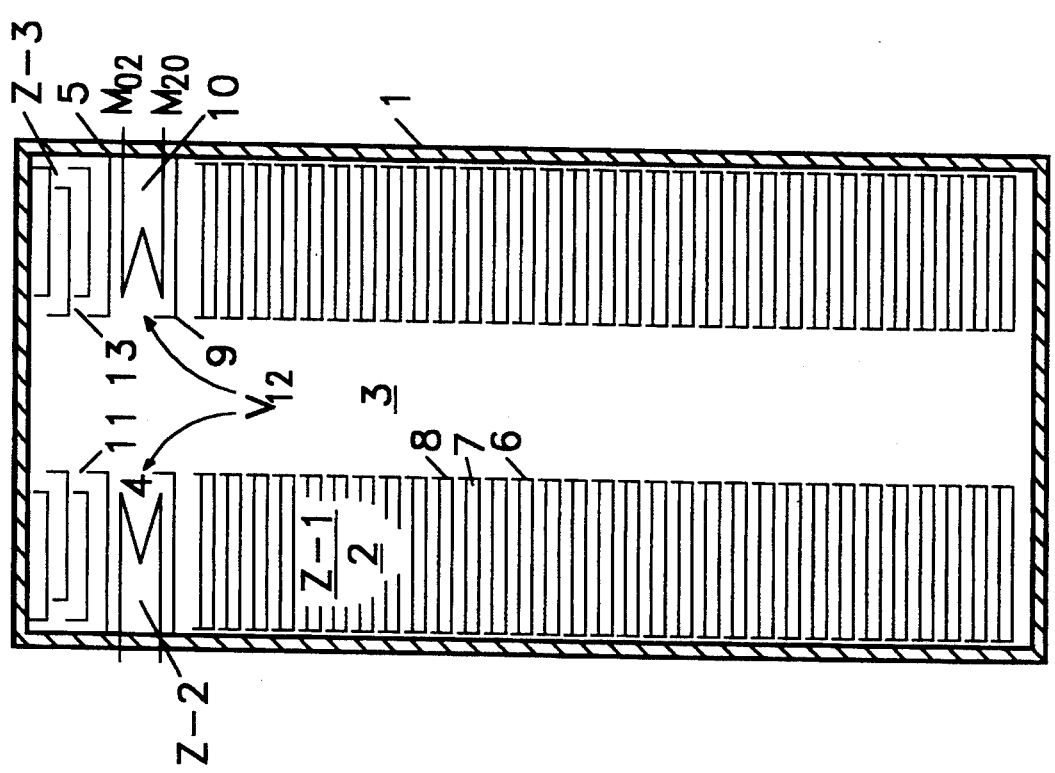

The system illustrated by FIG. 1A and 1B can also be used as a Class 3 system for a eutectic hydrate salts storage. Operational procedures are similar to those of a Class 1 system.

Figure 2:
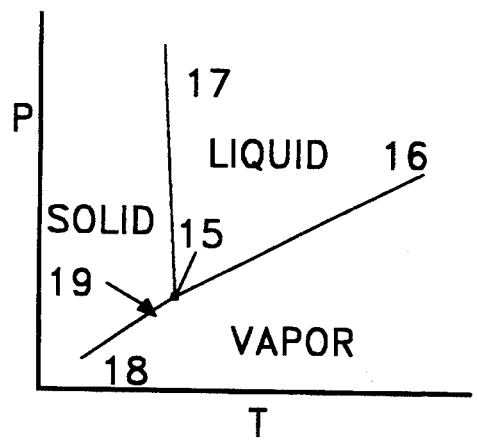

FIG. 2 illustrates the phase diagram for the water system. The operating conditions of a Class 1 system and a Class 2 system are illustrated in this figure.

Figures 3A, 3B:
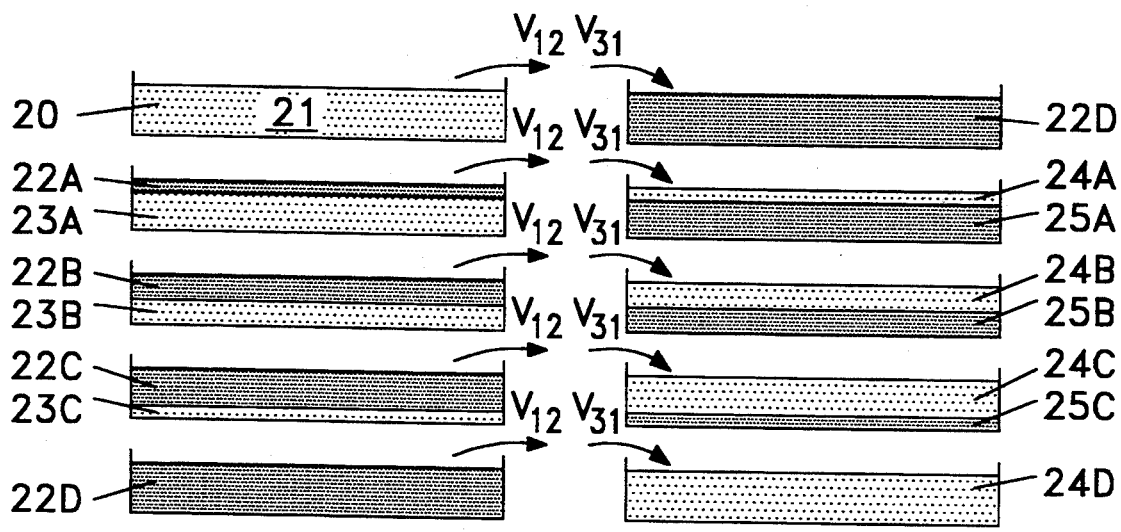
Figures 4A, 4B:
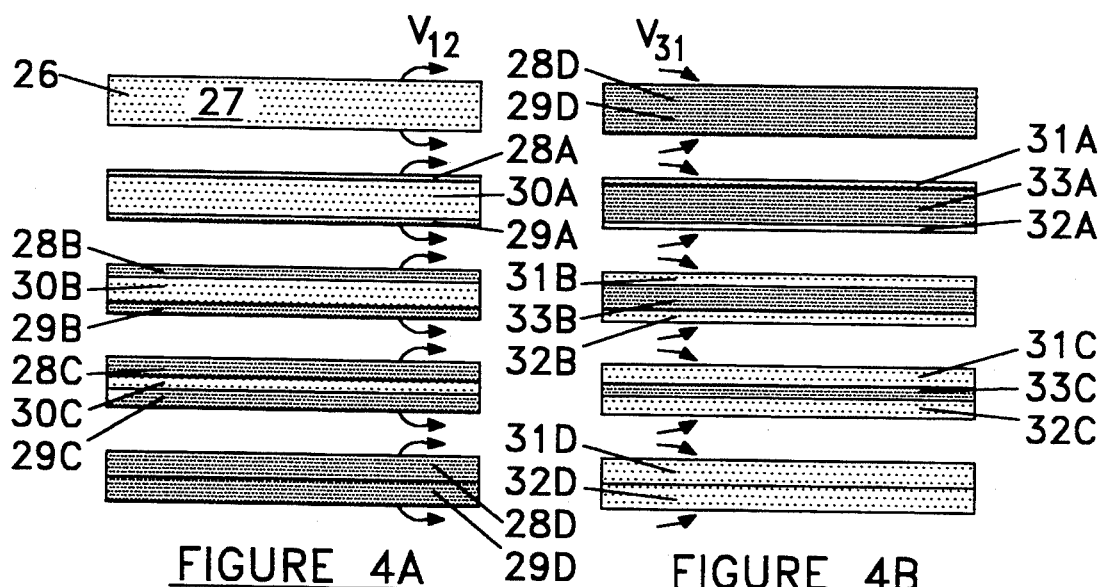

FIGS. 3A and 3B illustrate charging and discharging operations of a thin water layer retained on a tray in Zone 1 of a Class 1 system; FIGS. 4A and 4B illustrate charging and discharging operations of a layer of water retained in a thin layer of sponge in Zone 1 of a Class 1 system.

Figure 5B:
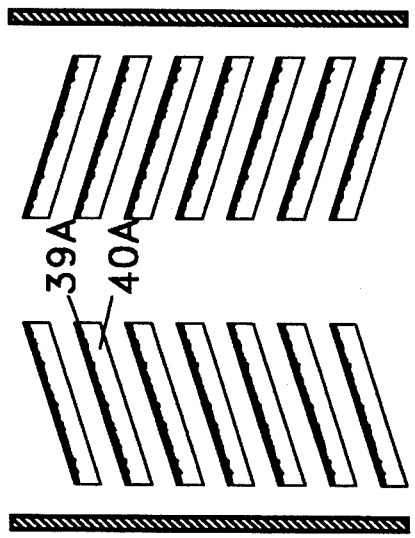
Figure 6B:
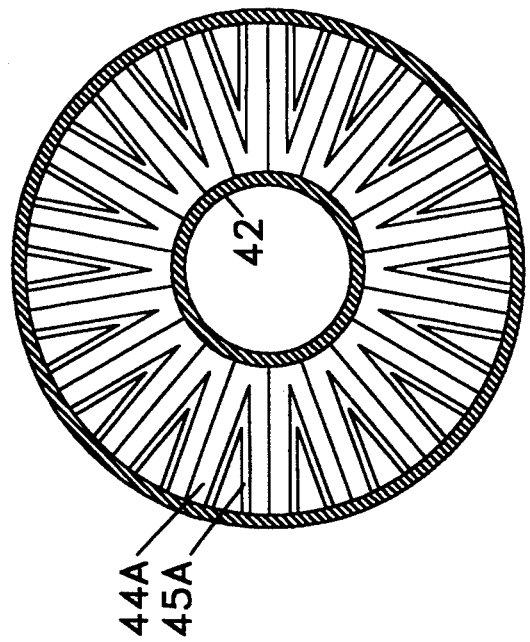
Figure 5A:
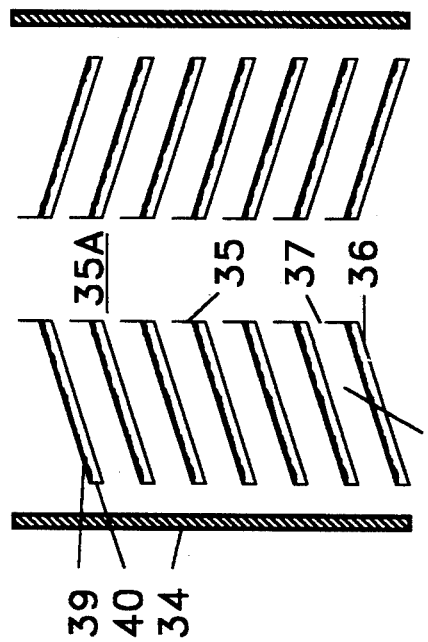
Figure 6A:
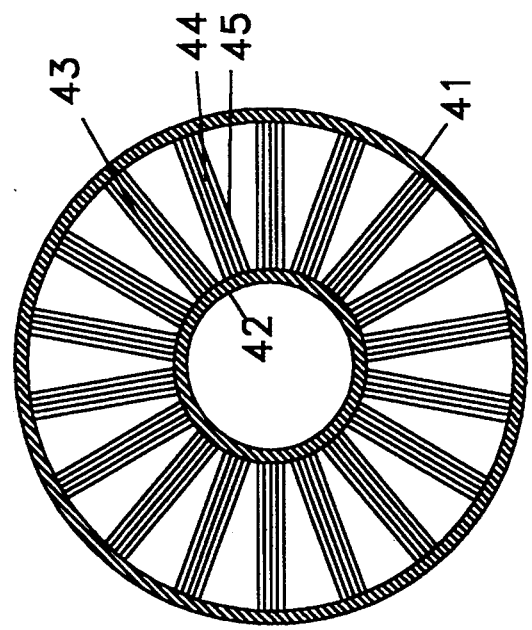

A Class 2 system is a dual purpose system which provides both cool thermal storage and separation and purification of dilute solutions. Water serves as the primary medium, the intermediate medium and the final medium. FIGS. 5A and 5B illustrate the structure of a Class 2 system in which slanted plates are placed at close spacing in Zone 1. The figures also illustrate the progress of the operation in a charging period. FIGS. 6A and 6B illustrate the structure of a Class 2 system in which vertical plates are placed in a radial direction in Zone 1. The figures also illustrate the progress in operating in a charging period.

Figure 7A:
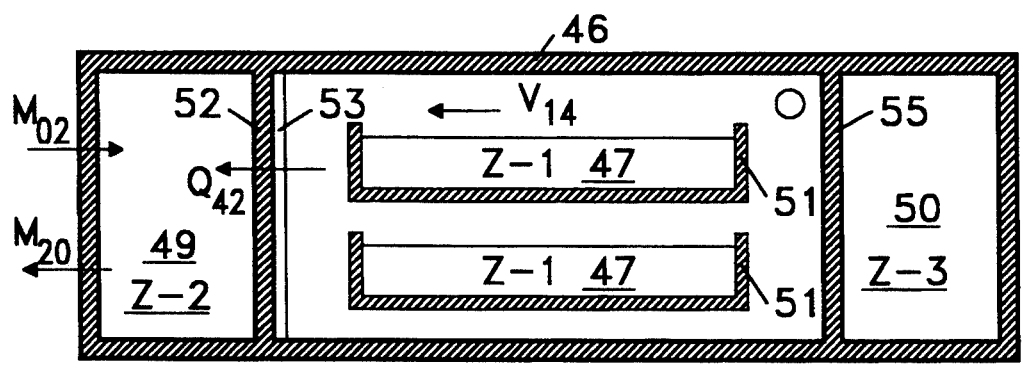
Figure 7B:
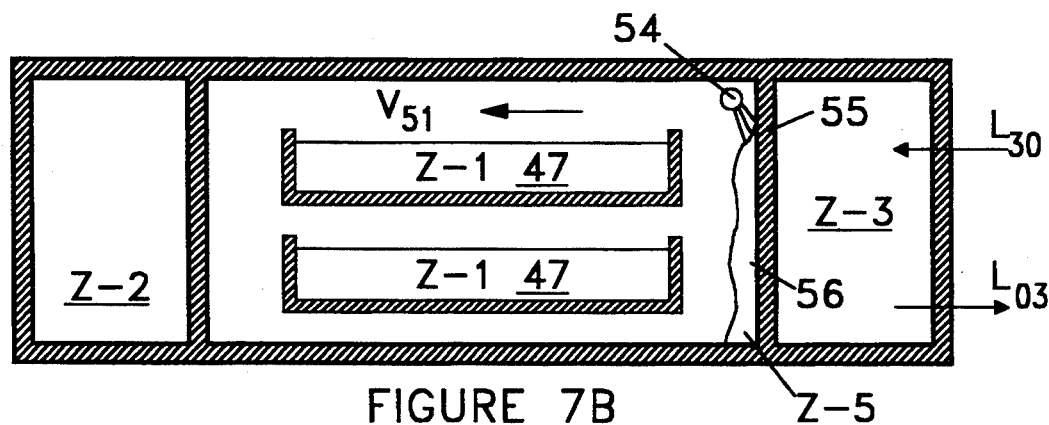

Convenient ways of transferring heat in condensing the first vapor and generating a second vapor during a charging and discharging period respectively are to utilize the vacuum vessel wall as the heat transfer walls. FIGS. 7A and 7B illustrate a system with such arrangements. In the system illustrated the interaction between the primary medium and the intermediate medium is by a direct contact interaction and the system represents one of the Class 1, Class 3 and Class 4 systems.

Figure 8A:
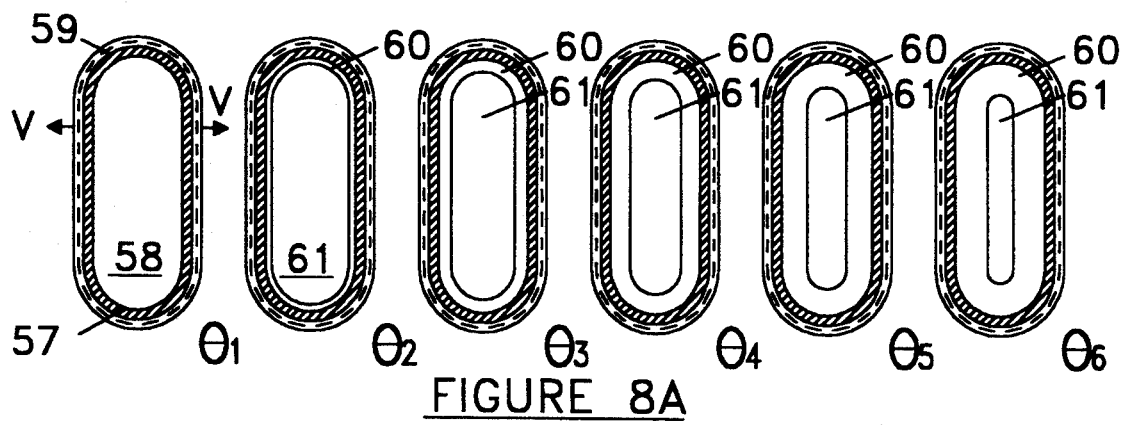
Figure 8B:
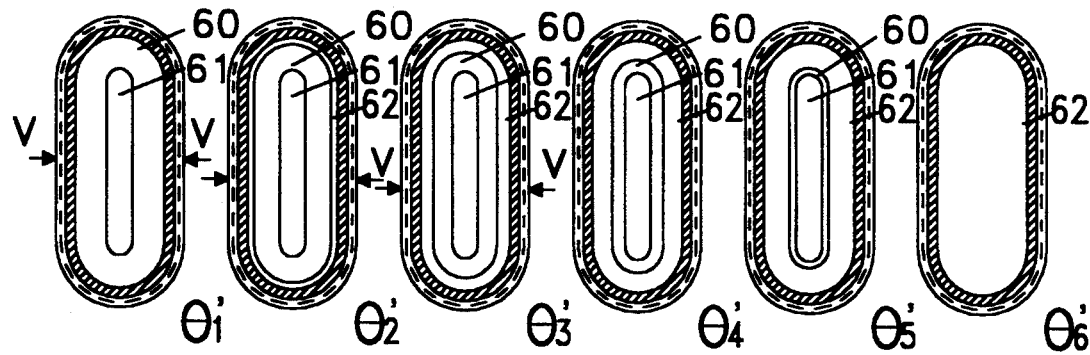

When the heat transfer between the primary medium and the intermediate medium is accomplished by an indirect contact heat transfer, one may use a thin wall polymer tube to separate the two mediums. Such arrangement may be used for Class 5, Class 6, Class 7 and Class 8 systems. FIGS. 8A and 8B illustrate the progress in a charging period and the progress in a discharging period in such a system.

Figure 9A:
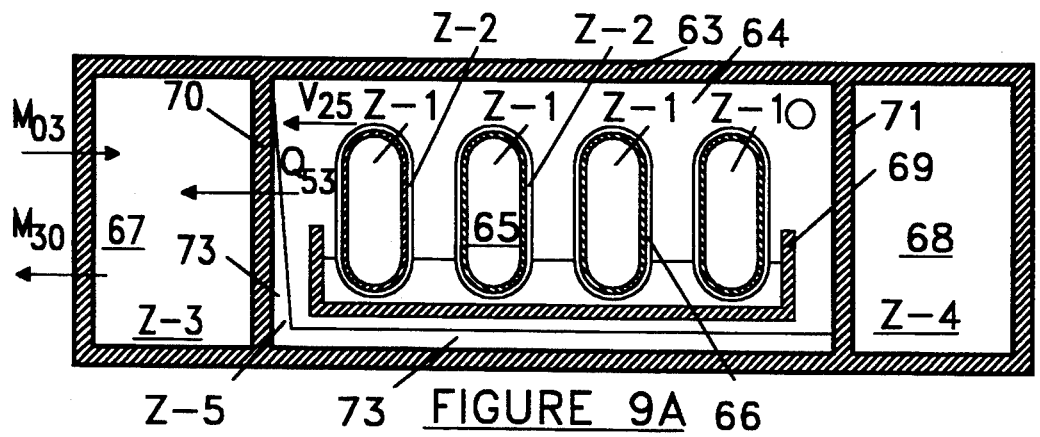
Figure 9B:
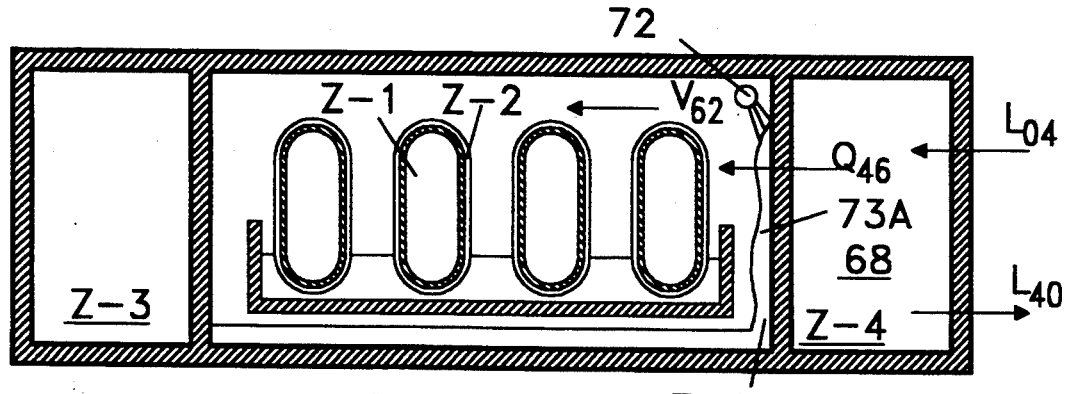

FIGS. 9A and 9B illustrate a system in which the vessel wall is used to transfer heat in condensing the first vapor and generating second vapor and the heat transfer between the primary medium and the intermediate medium are accomplished by the way illustrated by FIG. 8.

Figure 10A:
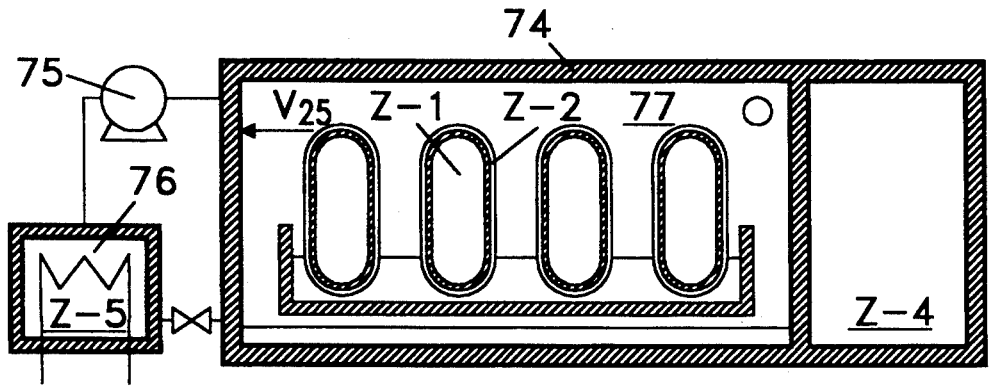
Figure 10B:
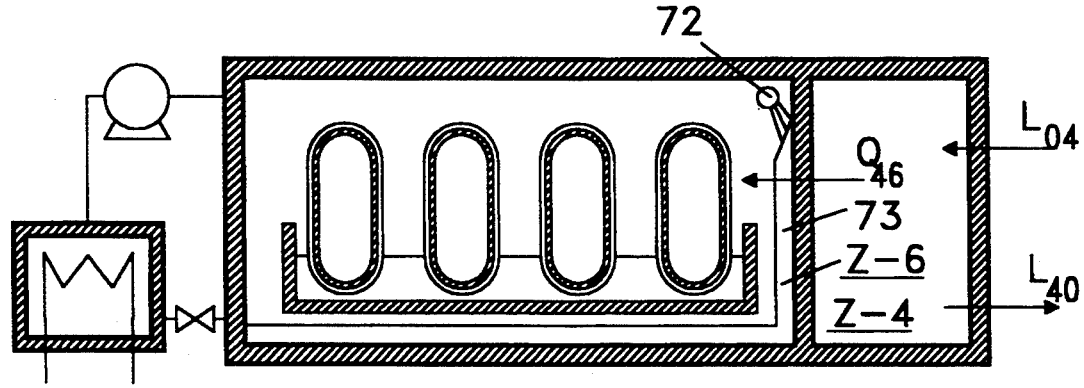

FIGS. 10A and 10B illustrate a Class 8 system which is similar to the system illustrated by FIGS. 9A and 9B, except that the intermediate medium used is a high pressure refrigerant such as Freon. In this system, the first vapor generated is directly compressed, condensed and returned to the system. In this way, a refrigeration loop is incorporated into the cool storage system directly.

Figure 11:
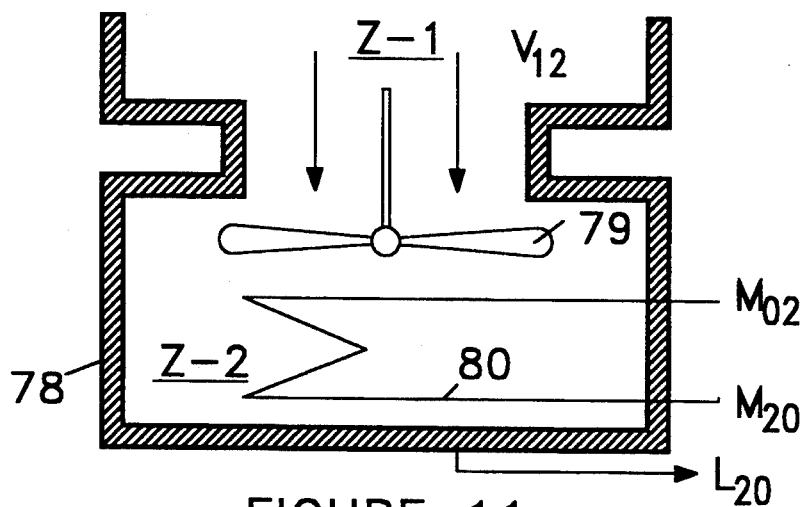
Figure 12:
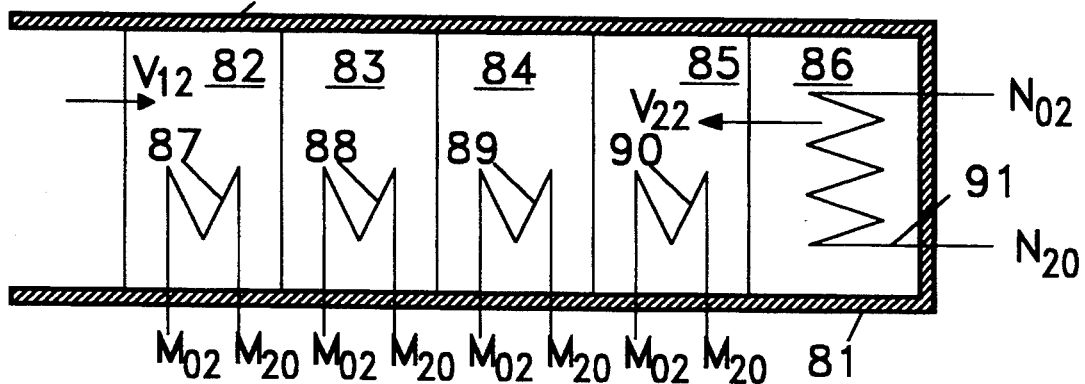
Figure 13:
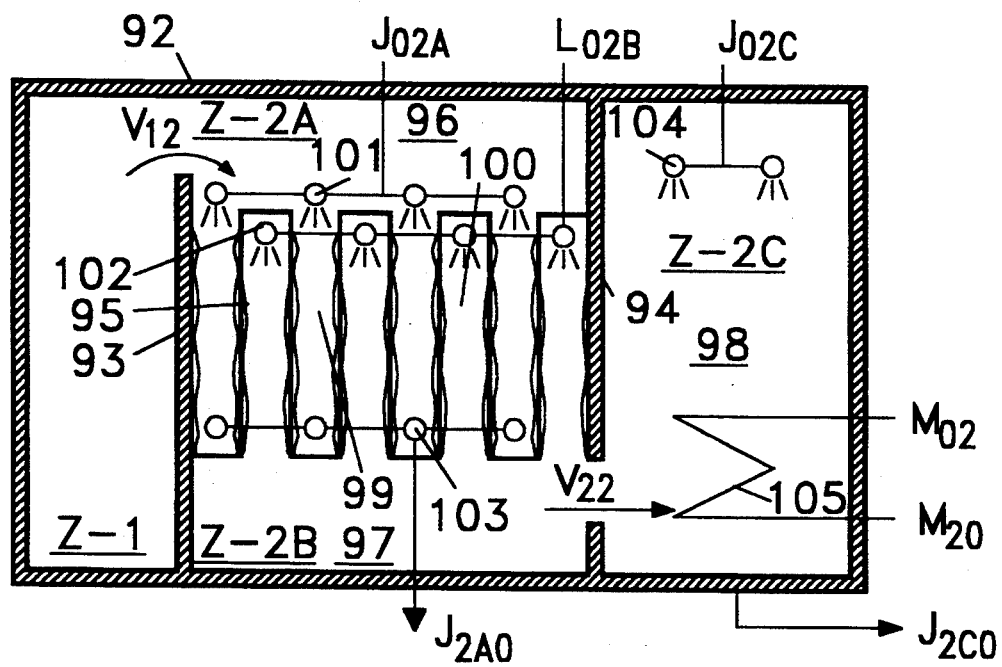
Figure 14:
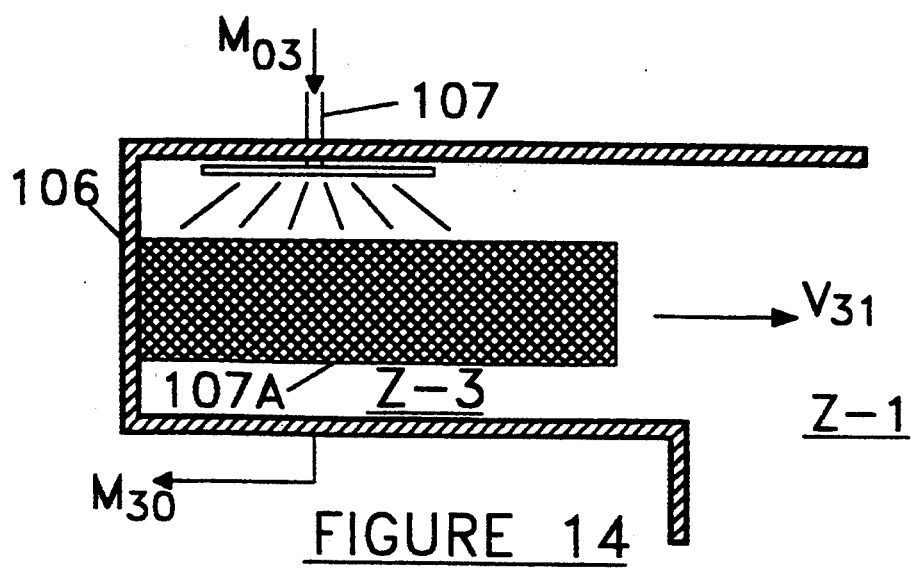
Figure 15:
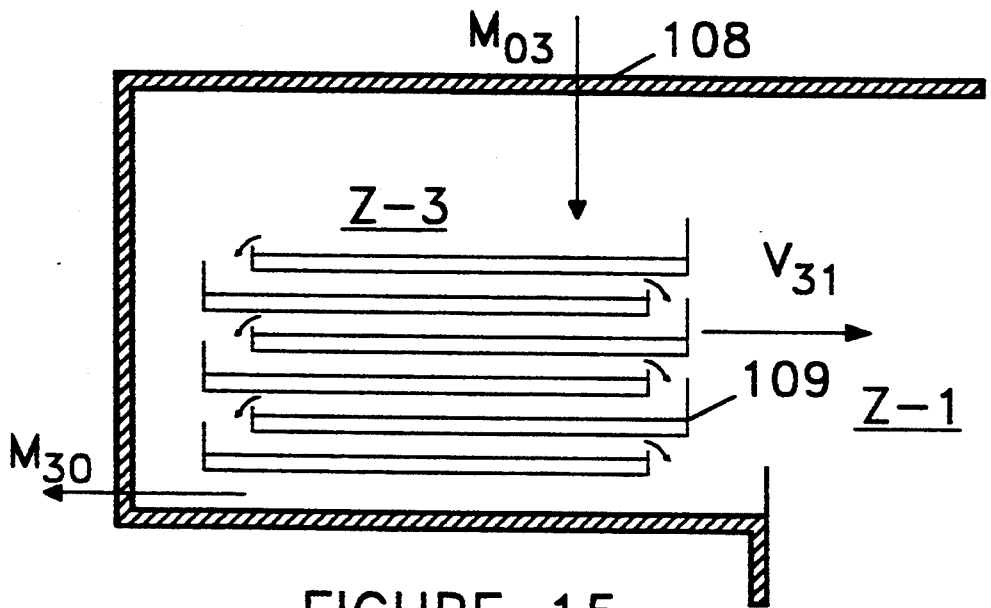
Figure 16:
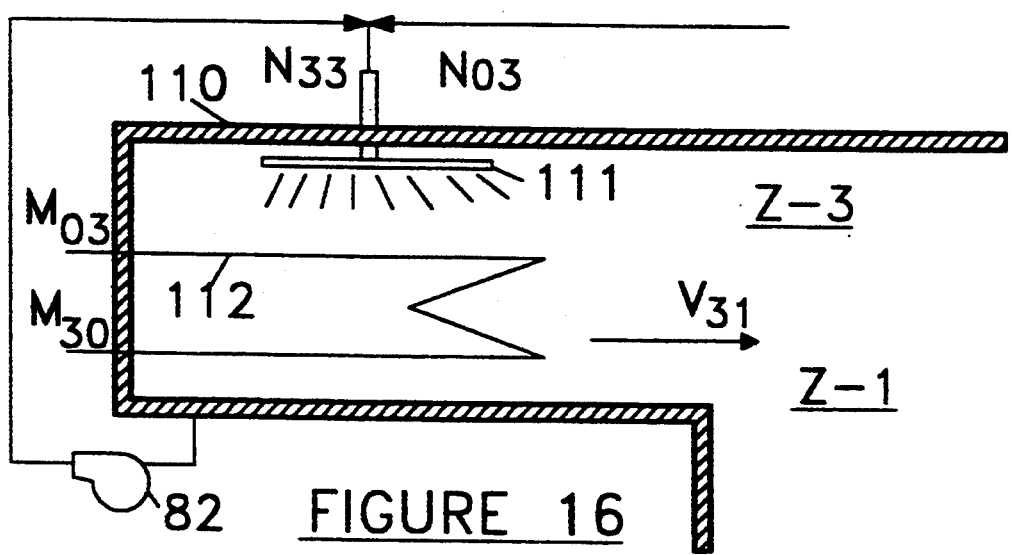

FIGS. 11, 12 and 13 illustrate various ways of transforming first vapors which are sub-triple point vapors into liquid masses; FIGS. 14, 15 and 16 illustrate various ways of flash vaporizing water to produce second vapor streams and chilled water streams.

DESCRIPTION OF THE PREFERRED EMBODIMENTS (BEST MODES FOR CARRYING OUT THE INVENTION)

The methods and apparatuses of the present invention are to be used in providing systems for cool thermal storage, both for long term storage such as seasonal storage and short term storage such as day by day storage. Some of the systems can also be used to accomplish purification of dilute solutions. Functionally, there are three working mediums used in a cool storage system of the present invention: (a) a primary cool storage medium, also referred to simply as a primary medium and denoted as Medium A, that undergoes solidification and melting (or, in case of hydrate, dissociation) operations to store and release coldness, (b) a final heat interaction medium, also referred to as a final medium and denoted as Medium B, that removes heat from a process or from room air at an air handler to provide air conditioning, and (c) an intermediate heat interaction medium, also referred to simply as an intermediate medium and denoted as Medium C, that undergoes vaporization and condensation operations that facilitates both the heat interaction between the primary medium and a refrigeration loop and the heat interaction between the final medium and the primary medium. During a charging period, the intermediate medium vaporizes to form a first vapor and remove heat from the primary medium to cause the primary medium to solidify and the first vapor condenses to release heat to a refrigeration loop; during a discharging period, the intermediate medium vaporizes to form a second vapor and remove heat from the circulating final medium and the second vapor condenses to supply heat to the primary medium solid to thereby melt the medium solid. A working medium may serve a single function, double functions or even triple functions. For example, water may be used only as the primary medium; water may be used to serve both as the primary medium and the final medium; water may be used to serve both as the primary medium and the intermediate medium; water may be used to serve all the functions of the primary medium, the final medium and the intermediate medium.

The use of an intermediate heat interaction medium that undergoes vaporization and condensation operations is a unique feature of a system of the present invention. The use of the intermediate medium greatly enhances heat interactions both during charging and discharging periods. The enhanced heat interactions make it possible to operate the evaporator in the refrigeration loop at a high temperature, in the range of −2° C. to −5° C. (28.4° F. to 23° F.) and greatly reduces the energy input in the cool storage system. The use of the intermediate medium also makes it possible to attain a nearly complete solidification of the primary medium at the end of a charging period and attain a nearly complete melting of the primary medium at the end of a discharging period.

Another unique feature is that the primary medium solid is formed in-situ and melted in-situ and is not transformed throughout the charging and discharging periods. This feature makes it possible to greatly simplify the equipment construction and simplify the operation. These lead to greatly reduced equipment cost and operation cost.

Heat exchange between the primary medium and the intermediate medium may either be a direct contact or an indirect contact operation. The type of equipment used depends greatly on the mode of heat exchange between these two mediums. Heat exchange between the final medium and the intermediate medium in a discharging period may also be a direct contact operation or an indirect contact operation. Systems of the present invention can be classified into many classes according to the primary medium used, the intermediate medium used, the final medium used, mode of heat exchange between the primary and intermediate mediums and the mode of interaction between the final medium and the intermediate medium. Direct contact heat exchanges between the primary and intermediate mediums take place in Class 1, 2, 3 and 4 systems to be described; indirect contact heat exchanges between the primary and intermediate mediums take place in Class 5, 6, 7 and 8 systems to be described.

FIGS. 1A and 1B illustrate the construction and operation of a Class 1 system. In the system water is used to serve the functions of the primary medium, the final medium and the intermediate heat medium, and the heat interaction between the primary medium and the intermediate medium is by a direct contact heat interaction.

FIG. 1A illustrates a condition during a charging period; FIG. 1B illustrates a condition during a discharging period. The system has a vacuum vessel 1 and comprises a first processing zone 2 (Zone 1), a main vapor passage 3, a second processing zone 4 (Zone 2), and a third processing zone 5 (Zone 3). Zone 1 is compartmentized by shallow trays 6. A mass of water 7 is retained on each tray. There is a small gap 8 between two neighboring trays that provides a vapor passage. Therefore, water on each tray is in vapor communication with Zone 2 and Zone 3. Referring to FIG. 1A, a first vapor $V_{12}$ is generated in Zone 1 during a charging period; referring to FIG. 1B, a second vapor $V_{31}$ enters the thin compartment in Zone 1 during a discharging period. Zone 2 is a zone in which first vapor is transformed into a condensed state during a charging period. Zone 3 is a zone in which water $M_{03}$ is flash vaporized to generate second vapor $V_{31}$ and a stream of chilled water $M_{30}$. In Zone 2 there is a partitioning wall 9, a set of heat exchangers 10 and an opening 11 allowing the first vapor to enter the zone. In Zone 3 there are trays 12 on which water 13 forms a cascading stream and flash vaporizes to form second vapor and a mass of chilled water. The second vapor leaves the zone through opening 14. It is noted that, in this system, water serves as the primary medium by solidification and melting; water serves as the intermediate medium by vaporizing and condensing; water serves as the final medium by being circulated between the cool storage system and the building to be air conditioned and be chilled and heated.

FIG. 2 illustrates the pressure temperature diagram for water. It shows the triple point 15 (0° C., 4.58 torr), a vaporization line 15–16, a melting line 15–17, and a sublimation line 15–18. The solid region, the liquid region and the vapor region are shown in the figure. During a charging period, a first vapor is produced by sublimation from the ice surface under a condition illustrated by point 19. During a discharging period, ice is melted under a condition close to the triple point 15.

FIG. 3A illustrates the progress of a charging operation taking place in a thin water layer within a shallow tray 20. At the beginning of the charging operation, the entire layer is liquid water 21. First vapor is formed by the vaporization of water and the top region of the water layer is supercooled and forms a layer of ice 22A on the top of a liquid layer 23A. Once an ice layer is formed, the liquid layer is covered by the ice layer. When the pressure 19 is lower than the triple point pressure 15, sublimation takes place, thereby continuing to form a first vapor and supercool the ice layer. The supercooling causes ice to form at the water/ice interface, which is the bottom surface of the ice layer. Sublimation and ice formation continue, therefore, the ice layer grows as illustrated by 22A, 22B, 22C and 22D, and the water layer diminishes as illustrated by 23A, 23B, 23C and disappears. Since the first vapor is produced mainly by sublimation, its pressure 19 is lower than the triple point pressure. Therefore, the first vapor is referred to as a sub-triple point vapor. The first vapor has to be removed from the first processing zone and be transformed into a liquid mass. Several ways of transforming the first vapor will be described later by referring to FIGS. 11, 12 and 13.

FIG. 3B illustrates the progress of a discharging operation that takes place in a thin water layer. Assuming that at the beginning of a discharging operation the entire layer is ice 22D. As the second vapor $V_{31}$ is brought in contact with the ice layer, the top layer is melted to form a thin liquid layer 24A leaving an ice layer 25A at the bottom. As the discharging operation progresses, the liquid layer becomes thicker as shown by 24A, 24B, 24C and 24D and the ice layer diminishes as shown by 25A, 25B, 25C and disappears. The operating pressure during a discharging operation is somewhat higher than the triple point pressure.

The amount of water on a tray is reduced during a charging period due to the formation of the first vapor and is increased during a discharging operation due to the condensation of the second vapor on the water layer. Therefore, the amount of water on a tray remains substantially unchanged after each cycle.

One may use thin layers of sponge to retain thin layers of water in Zone 1. When thin layers of sponge are used, vaporization and sublimation take place both from the top surface and bottom surface during a charging period and condensation of second vapor can also take place both on the top surface and bottom surface during a discharging period. FIG. 4A illustrates the progress of a charging period. It shows that initially a thin layer of sponge 26 is filled with liquid water 27. As the charging operation progresses, a top layer of ice is formed and grows in thickness as shown by 28A, 28B, 28C and 28D, a bottom layer of ice is formed and grows in thickness as shown by 29A, 29B, 29C and 29D, and the water layer diminishes as shown by 30A, 30B, 30C and disappears. FIG. 4B illustrates the progress of a discharging period. It shows that the entire layer is filled with ice at the beginning. As the discharging operation progresses, ice is melted both from the top and bottom to form a top liquid layer and a bottom liquid layer. The top liquid layer increases in thickness as shown by 31A, 31B, 31C and 31D; the bottom liquid layer also increases in thickness as shown by 32A, 32B, 32C and 32D; the ice layer diminishes as shown by 33A, 33B, 33C and disappears.

In summary, the system is operated cyclically and each cycle has a charging period and a discharging period. During a charging period, the following two steps take place respectively in Zone 1 and Zone 2:

Step 1: Generation of First Vapor and In-Situ Ice Formation

When the pressure in the first processing zone is reduced below the triple point pressure, a first vapor, whose pressure is lower than the triple point pressure (4.58 torr), is generated and a mass of ice is formed in-situ. The first vapor may be generated at the liquid/vapor interface by vaporization or be generated at a solid/vapor interface by sublimation. It is noted that a part of the water serves as the intermediate medium and the rest serves as the primary medium in this operation. The ice formed in each compartment is stored within the compartment in which it is formed. The pressure in the zone is maintained by removing water vapor from the zone.

Step 2: Transforming the First Vapor into a Condensed Mass

The first vapor formed in Step 1 flows to the second processing zone, where it is transformed into a condensed mass by one or more of the following operations: (a) an absorption operation, (b) an adsorption operation, (c) desublimation on a chilled organic fluid, and (d) a two step desublimation and desublimate melting operations.

During the discharging period, the following two steps take place respectively in Zone 3 and Zone 1:

Step 3: Production of Chilled Water and Second Vapor

A stream of water to be chilled $M_{03}$ is introduced into the third processing zone and is flash vaporized therein to produce chilled water $M_{30}$ and form a second vapor $V_{31}$ whose pressure is higher than the triple point pressure. It is noted that a part of the water serves as the intermediate medium and the rest serves as the final medium in this operation. The chilled water produced is used for air conditioning or for process cooling.

Step 4: In-Situ Melting of Ice

The second vapor generated in the third processing zone is brought in contact with the ice stored in the first processing zone to thereby simultaneously condense the second vapor and melt the ice in-situ.

FIGS. 5A and 5B and FIGS. 6A and 6B illustrate the constructions and operations of two Class 2 systems. A Class 2 system is a dual purpose system in which both cool storage and water purification are accomplished. In a Class 2 system, water is used to serve the functions of the primary medium, the intermediate medium and the final medium, and the heat interaction between the primary medium and the intermediate medium is by direct contact heat transfer.

The major differences between a Class 1 system and a Class 2 system are in the structures used inside of Zone 1 and operations conducted within Zone 1. In a Class 1 system, water is retained within thin compartments and remain stationary except for slight movements associated with freezing and melting operations. In a Class 2 system a stream of water to be purified flows over the ice surface to promote diffusion of impurities away from the solid-liquid interface. Two types of structures used are illustrated by FIGS. 5 and 6. The first type of structure is referred to as a slanted plate structure and a unit using this type of structure is referred to as a slanted plate unit; the second type of structure is referred to as a radial vertical plate structure and a unit using this type of structure is referred to as a radial vertical plate unit.

FIGS. 5A and 5B illustrate the structure of a slanted plate unit and also illustrate the progress in a charging period. The unit has a vertical vacuum vessel 34, a central distribution tube 35 enclosing a vapor passage 35a, a multitude of slanted plates 36, and a multitude of slots 37 for introducing water to be treated into the slanted spaces 38.

During the charging period, water vaporizes from the flowing water film 39 and is supercooled. Ice is formed from the supercooled liquid film to form a layer of ice 40 on the slanted plate surface. The position of the flowing liquid film moves upward as the ice layer thickness increases. A rather thick layer of ice may be formed without reducing the rate of forming ice. This is because the latent heat released in the formation of ice is transmitted through the liquid film and is utilized in supplying the latent heat of vaporization. It is noted that a part of the water serves as the intermediate medium and the rest serves as the primary medium in this operation.

FIG. 5B shows that a rather thick layer of ice 40A has been formed while a liquid film 39A continues to flow on its surface. The first vapor formed flows to Zone 2 and is transformed into a condensed mass in a way similar to that in a Class 1 system. Due to the flow of water to be treated over the ice surface, solutes in the water is transferred away from the ice/water interface as ice is formed. Therefore, the ice formed is purer than the original water. The unfrozen liquid becomes a concentrated solution and is discharged from the system.

During a discharging period, water to be chilled $M_{03}$ is introduced into Zone 3 and cooling in Zone 2 is stopped. The water $M_{03}$ flash vaporizes to form a second vapor and the rest of the water becomes a stream of chilled water $M_{30}$. The second vapor flows and comes in contact with the top surface of the ice layers. Simultaneous condensation of the second vapor and melting of ice takes place to form a purified water stream which is a combined stream of the condensate of the second vapor and melt of the ice. It is noted that a part of the water serves as the intermediate medium and the rest serves as the final medium.

FIGS. 6A and 6B illustrate the structure of a radial vertical plate unit and also illustrate the progress in a charging period. The unit has a vertical vacuum vessel 41, a central tube 42, a multitude of radial and vertical plates 43 held on the central tube, a multitude of distributors (not shown in the drawing) to distribute water to be treated onto the vertical surfaces. The figures show that a layer of ice 44 is formed from a flowing liquid film 45 and the ice layer becomes rather thick 44A toward the end of a charging period. The operations in this unit are the same as those described in the slanted plate unit.

The major emphasis in cool storage systems has been on ice making systems. While ice as a thermal energy storage material is intrinsically low in cost, it melts and freezes at an inconveniently low temperature for air conditioning purposes. The compressor cycle in the refrigeration loop loses efficiency and coefficient of performance as the suction temperature is lowered. It is well known that a phase change material with a little higher fusion temperature would improve performance. While about 10° C. (50° F.) would be ideal, something in the range of 5° C. to 15° C. (41° F. to 59° F.) should be considered if the cost is low, say less than $0.50/lb and its heat of fusion is reasonably high, say higher than 160 KJ/kg (70 Btu/lb). The following types of phase change materials may be used as the primary cool storage medium:

(1) Hydrates and mixture of hydrates, (2) Clathrates, (3) Organic substances, (4) Solvents forming a miscibility gap and (5) Chemicals undergoing reversible reactions.

Dr. George A. Lane of the Dow Chemical Co. has described a new phase change material that is a mixed hydrate $CaCl_2\ 6\ H_2O + CaBr_2\ 6\ H_2$ melting congruently at 14° C. (58° F.) and has a heat of fusion of 140 KJ/kg (61 Btu/lb). Clathrates are inclusion compounds that consist of molecular complexes which contain spaces or cages into which small molecules fit. The compound is called the host, the inclusions the guest molecules. Water and some organic molecules, eg benzene, can act as the host in clathrates. Another class of inclusion compound is zeolites, natural or synthetic aluminum silicates as a host, in which water may be the guest molecule. Tetradecane has a melting temperature of 5.9° C. and has a high latent heat of fusion of 55 cal/gr.

The system illustrated by FIGS. 1A and 1B may also represent a Class 3 system. In a Class 3 system, an aqueous mixture of hydrate forming salts such as $CaCl_2$ and $CaBr_2$ is used as the primary cool storage medium and water is used both as the intermediate medium and the final medium.

There are congruently melting hydrates and incongruently melting hydrates. When a solution at a given concentration is cooled below the hydrate forming temperature, hydrate crystals are formed. When a mixture of hydrate crystals and mother liquor is heated above the freezing temperature, the hydrate crystals decompose and become a liquid. In a Class 3 system a mass of mixture containing water and one or more hydrate forming solutes is placed in the thin compartments in Zone 1. Referring to FIG. 1A, during a charging period, a cooling medium is introduced in Zone 2 to draw vapor from Zone 1. The pressure in Zone 1 is thereby reduced to cause water to vaporize and cool the mixture below its hydrate forming temperature. A first vapor is formed and hydrate crystals are produced. The first vapor may either be a super-triple point vapor or a sub-triple point vapor. In the former case, the first vapor is transformed into a liquid mass by a simple condensation operation in Zone 2. During a discharging period, water to be chilled is flash vaporized in Zone 3 to form a second vapor at a second pressure and thereby produce a stream of chilled water. The second vapor is absorbed into the solution in the thin compartments of Zone 1 to decompose the hydrate crystals. The operating temperatures and pressures are respectively higher. In this system, the aqueous solution is the primary medium and water is the intermediate medium.

The system illustrated by FIGS. 1A and 1B may also represent a Class 4 system. In a Class 4 system, an aqueous mixture containing one or more solutes that are more volatile than water is used as the primary medium and a mixture of water and the volatile solutes are the intermediate medium and water also serves as the final medium. Some examples of the volatile solutes to use are ethanol, methanol, propanol and acetone. During a charging period, water and the volatile solutes vaporize to form a first vapor and cause water to freeze. The first vapor is transformed into a liquid mass by a condensation operation in Zone 2. During a discharging period, a warm water is chilled in Zone 3 to vaporize a mixture of water and the volatile solutes to form a second vapor. The second vapor enters Zone 1 to melt the ice therein.

It is desirable that a commercial system be a hermetically sealed system. FIGS. 7A and 7B illustrate a hermetically sealed system that can be used as a Class 1, Class 2, Class 3 or Class 4 system. The system has an enclosure 46, a primary cool storage and a direct contact heat interaction zone 47 (Zone 1), a heat rejection zone 49 (Zone 2), a heat input zone 50 (Zone 3). Referring to operation as a Class I system, water is introduced on trays 51 to form Zone 1. During a charging period, a refrigerant liquid $M_{02}$ is introduced into Zone 2 and vaporizes therein to become a refrigerant vapor $M_{20}$; water is vaporized in Zone 1 to form a first vapor $V_{14}$ and cause formation of ice in Zone 1. The first vapor is a sub-triple point water vapor and desublimes on the vessel wall 52 that is in heat communication with the heat rejection zone to form a desublimate layer 53 in a desublimation zone (Zone 4). Heat released in the desublimation operation $Q_{42}$ is transferred to the heat rejection zone. During a discharging period, a warm water stream $L_{03}$ from an air conditioned building is introduced into the heat input zone 50 (Zone 3), chilled and discharged as a stream of chilled water $L_{30}$ and is returned to the building for air conditioning. A stream of water is applied through a nozzle 54 on the wall 55 that is in heat communication with the heat input zone to form a liquid film of water 56. The water in the film vaporizes to form a second vapor $V_{51}$, the liquid film region forming a vaporization zone (Zone 5). The second vapor is a super-triple point vapor. The second vapor is brought in heat exchange relation with the ice in Zone 1 and the desublimate (ice) in Zone 4 to thereby condense the vapor and melt the ice. In this system, Zones 1, 4 and 5 are enclosed within an enclosure that can be hermetically sealed. The refrigeration medium and the circulating chill water stream do not enter the hermetically sealed enclosure. Therefore, the system can be operated reliably.

When the system illustrated by FIGS. 7A and 7B is used as Class 3 or Class 4 system, the first vapor formed is transformed into a liquid mass by a simple condensation operation on the wall 52 separating Zone 1 from Zone 2.

In some systems of the present invention, Class 5, Class 6, Class 7 and Class 8 systems, the heat transfer between the primary medium and the intermediate medium is by an indirect contact heat transfer. Therefore, the two mediums are separated by a heat conducting wall. The separating wall used may be a metal wall or a thin plastic film. One convenient way is to use an inexpensive lay-flat plastic tube.

FIG. 8 illustrates an oval shaped thin wall plastic tube 57 containing a mass of a primary medium 58 therein. There is a layer of wick material 59 covering the outer surface of the plastic tube. FIG. 8A illustrates the progress in a charging period and FIG. 8B illustrates the progress in a discharging period. Referring to FIG. 8A, when a mass of an intermediate medium liquid is applied to the wick and the tube is subjected to a low pressure, the medium liquid vaporizes to cool the primary medium. Letting the primary medium be water and the intermediate medium be ethanol, ethanol in the wick vaporizes to cause water 58 to freeze to form a mass of ice 60. As the charging operation progresses, the ice 60 increases in mass and the remaining liquid water 61 decreases in mass. During a discharging period, intermediate medium vapor condenses in the wick region and transfer heat to the primary medium. The medium solid melts, so that the mass of solid 60 diminishes and the mass of melt 62 increases.

FIGS. 9A and 9B illustrate the construction and operations of a hermetically sealed system with indirect contact heat transfer between the primary medium and the intermediate medium. The system may serve as a Class 5, Class 6, Class 7 or Class 8 system. Let us assume that the system is used as a Class 5 system, the primary medium used is water and the intermediate medium used is ethanol. The system has an enclosure 63 that contains an internal region 64 that contains a cool storage region (Z-1) 65, and an indirect contact heat interaction zone (Z-2) 66, a heat rejection zone (Z-3) 67 and a heat input zone (Z-4) 68. There are trays 69 that contain a mass of the intermediate mediums. The internal region 64 is separated from the heat rejection zone 67 (Zone 3) by a heat conductive separation wall 70 and is separated from the heat input zone (Zone 4) production 68 by another heat conductive separation wall 71.

During a charging period, a refrigerant liquid $M_{03}$ is introduced into Zone 3 to remove heat from the internal region. The refrigerant vaporizes and the refrigerant vapor $M_{30}$ is discharged. During this period, ethanol liquid is applied on the wick region (Z-2) and is vaporized to form a first vapor $V_{25}$ and removes heat from the primary medium. The primary medium, water, thereby freezes. The first vapor, ethanol vapor, condenses on the separating wall 70 to form a mass of condensate in a condensation zone 73 (Z-5). The condensate formed is returned to the tray. During a discharging period, the flow of the refrigerant to Zone 3 is stopped, and a stream of warm water from an air conditioned building $L_{04}$ is introduced into the heat input zone 68 and a stream of intermediate medium liquid, ethanol liquid, is applied through a nozzle 72 to one surface of the separating wall 71 separating the internal region 64 from the heat input zone 68. The intermediate medium liquid thereby forms a liquid film in an intermediate medium vaporization zone 73a (Zone 6). Heat is transferred from the circulating water stream to the intermediate medium liquid film. The circulating water is chilled and the chilled water $L_{40}$ is returned for cooling the building. The intermediate medium vaporizes to form a second vapor $V_{62}$; the vapor condenses in Zone 2 to release heat and melt the primary medium solid.

In a Class 6 system, the primary medium used is an aqueous solution containing hydrate forming solutes, and the intermediate medium is a low vapor pressure substance such as water, ethanol, methanol and propanol. Of course, the best intermediate medium to use is water. When water is used, the first vapor formed is a super-triple point water, which can be transformed into a liquid mass by a simple condensation operation. The system illustrated by FIGS. 9A and 9B can also be used as a Class 6 system. The operations of the system are similar to those described for the Class 5 system.

In a Class 7 system, the primary medium used is an organic substance with a proper melting point or range, such as tetradecane, and the intermediate medium is a low vapor pressure substance such as water, ethanol, methanol and propanol. Of course, the best intermediate medium to use is water. When water is used, the first vapor formed is a super-triple point water vapor, which can be transformed into a liquid mass by a simple condensation operation. The system illustrated by FIGS. 9A and 9B can also be used as a Class 7 system. The operations of the system are also similar to those described for the Class 5 system.

In a Class 8 system, a high vapor pressure refrigerant such as Freon is used as the intermediate medium and various substances may be used as the primary cool storage medium. The system illustrated by FIGS. 9A and 9B can also be used as a Class 8 system. However, since the vapor pressure is high enough to apply a compression operation to the first vapor formed, a refrigeration loop can be directly coupled with the cool storage system. FIGS. 10A and 10B illustrates such a system. The system comprises a first vessel 74, a compressor 75 and a condenser 76. The first vessel has a main processing region 77 that contains a cool storage zone (Z-1) and an indirect heat interaction zone (Z-2) and a heat input zone (Z-4). The operations of this system are mostly similar to those for the Class 5 system described, except for the following change:

(a) The first vapor formed is subjected to a compression operation by a compressor 75; the compressed refrigerant vapor is condensed in the condenser 76 by a stream of cooling water and the refrigerant liquid is returned to the main processing region.

It is noted that when a high vapor pressure refrigerant is used as the intermediate medium, it may also be used as the final medium. This is so because the refrigerant can be circulated between the air conditioned building and the cool storage system. The pressure drop is not excessive because the specific volume is small.

In this specification, the distinction between a "high vapor pressure refrigerant" and a "low vapor pressure refrigerant" is made by whether the refrigerant vapor under the given operation condition can be compressed by a conventional mechanical compressor. A vapor under a pressure lower than 100 torrs has a very high specific volume and cannot be compressed in an economical and practical manner. Therefore, a low vapor pressure refrigerant is defined as a refrigerant whose vapor pressure at 0° C. is less than 100 torrs and a high vapor pressure refrigerant is defined as a refrigerant whose vapor pressure at 0° C. is higher than 50 torrs, allowing some overlap in the ranges.

The first vapor formed in any of the systems described has to be transformed into a liquid mass. When the first vapor formed is a super triple-point vapor, the desired transformation can be accomplished by a simple condensation operation. However, when the first vapor formed is a sub-triple point vapor, a more elaborate method has to be used in the transformation. Three methods are illustrated in FIGS. 11, 12 and 13.

The unit illustrated by FIG. 11 has a vacuum enclosure 78, a low pressure vapor compressor 79 and a cooling unit 80. In operation, a first and sub-triple point vapor $V_{12}$ is compressed from a sub-triple point pressure to a super-triple point pressure and is condensed by the cooler to become a liquid stream $L_{20}$. A cooling medium $M_{02}$ enters the cooler, heated and discharged as $M_{20}$.

The unit illustrated by FIG. 12 transforms a first and sub-triple point vapor into a liquid stream by a two step operation involving desublimation and desublimate melting operations. The unit has a vacuum enclosure 81, four condensing compartments 82, 83, 84 and 85 and a second vapor generating compartment 86. The condensing compartments have cooling units 87, 88, 89 and 90 therein, and each compartment has a first vapor valve (not shown) and a second vapor valve (not shown). In the second vapor generation compartment, there is a heating coil 91 and a water spraying device (not shown). In operation, cooling medium is introduced into the cooling coils of three condensing compartments with the first vapor valves open and the second vapor vales closed so that desublimation of the first vapor takes place in these three compartments. Heating fluid is introduced into the heating coil in the second vapor generating compartment $N_{02}$ and is discharged as $N_{20}$ and water is sprayed on the heating coil to generate second vapor. The second vapor valve and the first vapor valve of the remaining condensing compartment are respectively open and closed to admit second vapor and melt the desublimate. The melt of the desublimate becomes the desired transformed liquid mass.

The unit illustrated by FIG. 13 accomplishes the desired transformation by two stage absorption operations. The unit has a vacuum enclosure 92, partitioning walls 93, 94 and 95 to separate the unit into Zone 1, Zone 2A 96, Zone 2B 97 and Zone 2C 98. Vertical compartments 99 in Zone 2A, thin vertical compartments 100 in Zone 2B, spraying means 101 for spraying absorbing solution $J_{2A0}$ on walls of the thin vertical compartments in Zone 2A, spraying means 102 for spraying water on the walls of the thin vertical compartments in Zone 2B, manifolds 103 for discharging diluted absorbing solution $J_{02A}$ from Zone 2A, spraying means 104 for spraying another absorbing solution $J_{02C}$ and an opening for discharging diluted absorbing solution $J_{2C0}$ from Zone 2C.

In operation, a first and sub-triple point vapor formed in Zone 1 is absorbed into the absorbing solution $J_{02A}$ so that the absorbing temperature is lifted above the pure water saturation temperature corresponding to the absorption pressure. The heat generated in the absorption operation is transmitted to water in Zone 2B to generate water vapor $V_{22}$ at a super-triple point pressure. The super-triple point vapor so generated is absorbed into the other absorbing solution 105 $J_{02C}$ with the heat of absorption removed by a heat transfer medium $M_{02}$, $M_{20}$. The first vapor is absorbed into the first absorbing solution to become a part of the diluted first absorbing solution.

It has been described that, in some cases, during a discharging period, a water stream is flash vaporized to produce a second vapor stream $V_{31}$ and a chilled water stream. FIGS. 14, 15 and 16 illustrate three ways of accomplishing this function.

FIG. 14 illustrates a direct spray unit which has a vacuum enclosure 106, a spray device 107 and a packed bed 107A. When the unit is maintained under a proper pressure somewhat higher than the triple point pressure and a water stream $M_{03}$ to be chilled is sprayed on the packed bed, water flash vaporizes to produce a second vapor $V_{31}$ and a stream of chilled water $M_{30}$. The chilled water $M_{30}$ is used for process cooling and/or building cooling and returned with makeup water. The second vapor formed is used to melt ice or hydrate crystals in Zone 1. FIG. 15 illustrates a cascade unit which has a vacuum enclosure 108 and several staggered trays 109. Water to be chilled $M_{03}$ flows downward through the trays, flash vaporizes to form second vapor and a chilled water stream $M_{30}$.

FIG. 16 illustrates an indirect spray unit. It has a vacuum enclosure 110, a spraying device 111, and a heat exchange coil 112. There are two water streams M and N involved in an operation of the unit. A water stream $N_{03}$ and a recycle stream $N_{33}$ are combined and sprayed on the heat exchange coil. Water flash vaporizes from the combined stream to produce a second vapor $V_{31}$ and a chilled water stream. An external water stream $M_{03}$ flows inside of the heat exchanger coil and is cooled to become another chilled water stream $M_{30}$, which is used for process cooling or building cooling. As has been illustrated in FIGS. 7, 9 and 10, a vertical wall may also be used to separate circulating water to be chilled and a liquid film from which second vapor is generated.

A final heat interaction medium is circulated between a process equipment or an air conditioned building and a cool storage system. The medium leaving the process equipment or the building is said to be at a high energy state; the medium leaving the cool storage system is said to be at a low energy state. When a stream of chilled water is fed to the cool storage at 15° C. and is discharged at 45° C., the medium at the former state is at the high energy state and the medium at the latter state is at the low energy state.

In summary, some general remarks are made about the following key features of the systems of the present invention: (a) primary medium; (b) final medium; (c) intermediate medium; (d) interaction between the primary medium and the intermediate medium; (e) interaction between the final medium and the intermediate medium; (f) interaction between the intermediate medium and the external cooling medium; (g) vessel; (h) reliability in operation; (i) high levels of charging and discharging; and (j) small difference between the exothermic transformation temperature and the evaporation temperature.

These remarks are presented as follows:

(A) Primary Medium

In general a primary medium is subjected to an exothermic transformation during a charging period in the temperature range of −5° C. to 20° C. and is subjected to an endothermic transformation during a discharging period. When water is used, the transformations are freezing and melting at around 0° C.; when a mixed hydrate $CaCl_2$ 6 $H_2O$ + $CaBr_2$ 6 $H_2O$ is used, the transformations are hydrate crystal formation and decomposition of the hydrate crystals at 14° C.; when tetradecane is used the transformations are freezing and melting of tetradecane at 5.9° C.; when a mixture forming solubility gap is used, the transformations are liquid-liquid phase separation and mutual dissolution below and above the consolution temperature; when a set of chemicals that undergo a set of reversible chemical reactions is used, the transformations are the exothermic and endothermic reactions that take place in the opposite directions.

Beside the cost of the medium, a major factor to consider in selecting a primary medium is the exothermic transformation temperature, because the evaporation temperature of the refrigeration loop has to be lower than it. According to a thermodynamics, the work input required decreases by about 2.887 as the evaporator temperature is raised by 1° C. (1.8° F.). It has been stated that the best primary medium to use is a medium that undergoes the exothermic transformation at around 10° C.

(B) Final Medium

The final medium used in a cool storage system is circulated between the process or building to be cooled and the cool storage systems. It has to be low in cost, have low impact to the environment and it has to have low pressure drop in circulating through the loop. When a vaporizing refrigerant is used as the final medium, the pressure drop of the refrigerant vapor flow is the major factor. Therefore, a refrigerant having a very low vapor pressure cannot be used through a long distance. Probably the most practical medium to use is water or an aqueous solution that absorbs and releases sensible heat only without undergoing vaporization.

(c) Intermediate Medium

An intermediate medium is subjected to vaporization and condensation operations: (1) vaporizes to form a first vapor and thereby remove heat from the primary medium in Step 1, (2) the first vapor is transformed into a condensed mass in Step 2, (3) interact with the final medium and vaporizes to generate a second vapor in Step 3, and (4) the second vapor condenses to melt the primary medium solid. An intermediate medium may be a high vapor pressure medium whose vapor can be compressed directly and be condensed or it may be a low vapor pressure medium such that the first vapor generated has to be condensed by an auxiliary refrigeration loop. A major factor in selecting an intermediate medium is whether the first vapor generated can be condensed into a liquid mass by a simple condensation operation. When the first vapor is a sub-triple point vapor, it desublimes to form ice (desublimate) on the cooling surface and add to the heat transfer resistance. One has to either cope with the added heat transfer resistance problem by using an extended cooling surface or use more complex methods described earlier by referring to FIGS. 11, 12 and 13. When ethanol, methanol, propanol and acetone are used, the first vapor generated can be condensed by simple condensation operations.

(D) Interaction between the primary Medium and the Intermediate Medium

The heat transfer between the primary medium and the intermediate medium may be indirect or direct. In the indirect case, there is an intervening heat conductive solid film separating the two mediums. By providing an extensive area, some level of heat transfer resistance can be tolerated. Since there is substantially no pressure difference across the film, a thin and flexible film can be used. Therefore, one may use a polymer film. One approach is to use flat polymer tube, and partially fill the tube into an oval shape and place a layer of wick material over the tube. Another approach is to place a mass of the primary medium inside of a thin pancake shaped polymer bag that is covered with a layer of wick material. In the direct case, there is no intervening solid film. Referring to FIGS. 3A and 3B, the zone between the subliming solid-vapor interface and the ice forming solid-liquid interface is ice itself.

(E) Interaction between the Final Medium and the Intermediate Medium

The interaction between the final medium and the intermediate medium may either be direct or indirect. When water at the high energy state, i.e. at the state returned from the air conditioned building, and is flash vaporized in a way illustrated by FIGS. 14 and 15, a portion of the water serves as the intermediate medium and the rest as the final medium. Indirect cases have been illustrated by FIGS. 7A, 7B, 9A, 9B, 10A, 10B and 16. The systems illustrated by these figures can be hermetically sealed systems. Referring to FIGS. 9A and 9B, for example, there is hermetically sealed region 64. One may use the vessel wall as the heat interaction wall between the two mediums.

(F) Interaction between the Intermediate Medium and the External Cooling Medium

As illustrated by FIGS. 7A and 9A, the heat transfer between the condensing first vapor and the external cooling medium normally takes place across a heat transfer wall 52, 70 with a proper design, a portion of the vessel wall may serve as the heat transfer wall.

(G) Vessel

It is advantageous to use lightweight hermetically sealed vessel with the portions of the wall serving as the heat transfer walls transferring heat from the intermediate medium to the external cooling medium and from the final medium to the intermediate medium in Step 2 and Step 3 described.

(H) Reliability in Operation

It is very important that a cool storage system can be operated unattended and reliably. When a hermetically sealed vessel is used so that the external cooling medium and the final medium are connected to the exterior of the vessel, the resulting system can be operated with very little attendance.

(I) High levels of Charging and Discharging

Due to the use of the intermediate medium, the first vapor can be generated wherever there is primary medium liquid to be solidified, and the second vapor can reach a region where there is primary medium solid to be melted. Therefore, high levels of charging and discharging can be attained.

(J) Small difference between the Exothermic Transformation Temperature and the Evaporation Temperature of the Refrigeration Loop The work input to a cool storage is related mostly to the evaporator temperature of the refrigeration loop. This temperature is lower than the exothermic transformation temperature of the primary medium. The difference in these two temperatures is related to the resistances of heat and mass transfer operations. In a system of the present invention, these resistances are very small. Therefore, the difference in the two temperatures is small. This leads to a great energy saving in operating the system.

What is claimed are as follows:

1. A process of subjecting a primary cool storage medium, also referred to simply as a primary medium, to exothermic transformation (heat releasing transformation) and endothermic transformation (heat absorbing transformation) operations and providing a mass of a final heat interaction medium, also referred to simply as a final medium, at a low energy state to be used for process cooling and/or air conditioning, through at least a step of heat interaction between the primary medium and an intermediate heat interaction medium, also referred to simply as an intermediate medium, that undergoes vaporization and condensation operations in a processing system that comprises:

(a) A cool storage zone (Zone A) containing a mass of the primary medium, (b) A first heat interaction zone (Zone B) that surrounds the cool storage zone and contains a mass of the intermediate medium, an extended interfacial area for heat interaction being provided between the cool storage zone and the first heat interaction zone, (c) A vapor space (Zone c) that surrounds the first interaction zone and provides one or more vapor passages, (d) A heat rejection zone (Zone D) containing an external cooling medium, and (e) A heat input zone (Zone E) through which the final medium supplies heat to the system;

and is characterized in conducting the process cyclically and each cycle comprises a charging period of subjecting the primary medium to an exothermic transformation and a discharging period of subjecting the primary medium to an endothermic transformation; the operation conducted during a charging period comprises the following steps:

Step 1: Exothermic Transformation of the Primary Medium and Generation of a First Vapor The pressure in Zone B is maintained at a pressure such that a mass of the intermediate medium is vaporized to form a mass of a first vapor and cause a mass of the primary medium to undergo the exothermic transformation;

Step 2: Transformation of the First Vapor into a Condensed Mass

The first vapor formed in Step 1 passes through the vapor space and is transformed into a condensed mass by an operation that comprises a step of transferring heat from the first vapor to the cooling medium in Zone D;

the operation conducted during a discharging period comprises the following steps:

Step 3: Transformation of the Final Medium from a High Energy State to a Low Energy State and production of a Second Vapor A stream of the final medium at a high energy state is introduced into Zone E and a heat interaction between the final medium and an intermediate medium is established to thereby produce a second vapor and transform the final medium from the high energy state to the low energy state, the final medium at the low energy state being used for the desired process cooling or air conditioning;

Step 4: Endothermic Transformation of Primary Medium

The second vapor formed in Step 3 is brought into a heat exchange relation with the primary medium from Step 1 to thereby transform the second vapor into a liquid mass and cause the primary medium to undergo the endothermic transformation.

2. A process of claim 1, wherein the exothermic transformation of the primary medium is a crystallization operation by which a mass of the primary medium solid is formed and the endothermic transformation of the primary medium is a liquefaction operation by which the primary medium solid is transformed into a mass of primary medium liquid.

3. A process of claim 2, wherein the interaction between the primary medium and the intermediate medium in Step 1 is a direct contact interaction.

4. A process of claim 2, wherein the interaction between the primary medium and the intermediate medium in Step 1 is an indirect contact interaction.

5. A process of claim 2, wherein the interaction between the final medium and the intermediate medium in Step 3 is an indirect contact interaction.

6. A process of claim 2, wherein the interaction between the final medium and the intermediate medium in Step 3 is an indirect contact interaction.

7. A process of any of claims 3 through 6, wherein the primary medium is water.

8. A process of any of claims 3 through 6, wherein the primary medium is a dilute aqueous solution.

9. A process of claim 8, wherein a mass of the dilute aqueous solution is introduced to Zone A in each cycle and a mass of the melt of the primary medium solid is discharged as a product.

10. A process of claim 9, wherein the interface between the primary medium solid and the primary medium liquid is agitated during Step 1.

11. A process of any of claims 3 through 6, wherein the primary medium is an aqueous solution of one or more hydrate forming salts.

12. A process of any of claims 3 through 6, wherein the primary medium is an aqueous solution containing one or more volatile solutes.

13. A process of claim 12, wherein the volatile solutes are selected from ethanol, methanol, propanol and acetone.

14. A process of any of claims 3 through 6, wherein the intermediate medium is a pure substance or a mixture of substances whose vapor pressure at 0° C. is in the range of 4.5 torrs to 100 torrs.

15. A process of claim 3, wherein the intermediate medium is a substance or a mixture of substances chosen from water, methanol, ethanol, propanol and acetone.

16. A process of any of claims 3 through 6, wherein the intermediate medium is a substance or a mixture of substances whose vapor pressure at 0° C. is greater 50 torrs and further comprises a step of compressing the first vapor and condensing the resulting compressed vapor.

17. A process of any of claims 3 through 6, wherein the final medium contains water as a major component.

18. A process of claim 17, wherein the final medium is substantially pure water.

19. A process of claim 17, wherein the final medium at the high energy state is warm water returned from a process or a building and the final medium at the low energy state is the chill water to be returned to the process or the building.

20. A process of any of claims 3 through 6, wherein the final medium is a high vapor pressure refrigerant, where vapor pressure at 0° C. is greater than 50 torrs.

21. A process of claim 1, wherein the exothermic transformation takes place in the temperature range of −5° C. to 20° C.

22. An apparatus for subjecting a primary cool storage medium to cyclic operations each cycle comprising an exothermic transformation and an endothermic transformation operation to thereby produce a mass of a final heat interaction medium at a low energy state to be used for process cooling or air conditioning and thereby provide a cool thermal storage system that comprises a storage zone (Zone A) containing a mass of the primary cool storage medium, also referred to simply as the primary medium, a first heat interaction zone (Zone B) containing a mass of an intermediate heat interaction medium, also referred to simply as the intermediate medium, and surrounding the storage zone, a vapor space (Zone C) that encloses the first heat interaction zone, a heat removal zone (Zone D) and a heat input zone (Zone E) that comprises:

(1) A vessel that contains Zone A, Zone B, Zone C, Zone D and Zone E, (2) A primary holding structure that divides Zone A into multiple processing sub-zones thereby providing an extensive interaction surface between the primary medium and the intermediate medium, (3) Vapor passages provided in Zone C, (4) Heat transfer equipment in Zone D to remove heat from a vapor stream and transform the vapor into a condensate mass, (5) An extensive interaction area between Zone E and Zone C to enhance interaction between the final medium and the intermediate medium;

characterized in that the apparatus is operable in cycles and each cycle comprises a charging period and a discharging period and the operation conducted during a charging period comprises the following steps:

Step 1. Subjecting the Primary Medium to the Exothermic Transformation and Generation of a First Vapor The pressure in Zone B is maintained at a pressure such that a mass of the intermediate medium is vaporized to form a mass of a first vapor and subject a mass of the primary medium liquid to the exothermic transformation;

Step 2. Transformation of the First Vapor into a Condensed Mass

The first vapor formed in Step 1 passes through the vapor space and is transformed into a condensed mass by an operation that comprises a step of transferring heat from the first vapor to the cooling medium in Zone D.

and the operation conducted during a discharging period comprises the following steps:

Step 3. Transformation of the Final Medium from High Energy State to a Low Energy State and Production of a Second Vapor A stream of the final medium at a high energy state is introduced into Zone E and a heat interaction between the final medium and an intermediate medium is established to thereby produce a second vapor and transform the final medium from the high energy state to the low energy state, the final medium at the low energy state being used for the desired process cooling or air conditioning.

Step 4. Subjecting the Primary Medium to the Endothermic Transformation

The second vapor formed in Step 3 is brought into a heat exchange relation with the primary medium from Step 1 to thereby transform the second vapor into a liquid mass and subject the primary medium to the endothermic transformation.

23. An apparatus of claim 22, wherein the exothermic transformation of the primary medium is a crystallization operation by which a mass of the primary medium solid is formed and the endothermic transformation of the primary medium is a liquefaction operation by which the primary medium solid is transformed into a mass of the primary medium liquid.

24. An apparatus of claim 23, wherein there is no solid partitioning wall separating the storage zone from the first heat interaction zone so that the heat interaction between the primary medium and the intermediate medium is through a mass of the two mediums.

25. An apparatus of claim 23, wherein there are one or more solid partitioning walls separating the storage zone from the first heat interaction zone so that the heat interaction between the two mediums passes through the partitioning walls and further comprises a feeding means to supply a mass of the intermediate medium into the first heat interaction zone.

26. An apparatus of claim 25, wherein the solid partitioning walls are made of flexible material so that the two zones separated by the walls are under substantially the same pressure.

27. An apparatus of claim 25, wherein the heat rejection zone (Zone D) is separated from the vapor space (Zone C) by at least a portion of the vessel wall and the heat released in condensing the first vapor in Step 2 passes through the wall.

28. An apparatus of claim 23, wherein both the intermediate medium and the final medium are water and further comprises an extensive gas-liquid interaction structure so that the operation of Step 3 is accomplished by flash vaporizing a stream of water in a gas-liquid interaction structure.

29. An apparatus of claim 23, which further comprises a heat transfer wall separating the heat input zone (Zone E) from the vapor space (Zone C), and Step 3 is accomplished by transferring heat from the final medium to the intermediate medium through the heat transfer wall.

30. An apparatus of claim 29, wherein the heat input zone (Zone E) is separated from the vapor space zone (Zone C) by at least a portion of the vessel wall and the heat interaction between the final medium and the intermediate medium in Step 3 is through the vessel wall.

31. An apparatus of claim 23, wherein the primary holding structure comprises a multitude of shallow trays.

32. An apparatus of claim 23, wherein the primary holding structure comprises a multitude of slated plates.

33. An apparatus of claim 23, wherein the primary holding structure comprises a multitude of vertical plates.

34. An apparatus of claim 33, wherein the partitioning walls comprise one or more plastic films and the feeding means to supply a mass of the intermediate medium comprises one or more pieces of wick material.

35. An apparatus of claim 34, wherein the partitioning walls are provided by one or more flexible polymer tubes and the primary medium is contained therein.

36. An apparatus of claim 23, which further comprises means of agitating the interfacial area between the primary medium solid and the primary medium liquid.

37. An apparatus of claim 36, wherein the primary medium liquid forms a thin liquid film on the surface of the primary medium solid.

38. An apparatus of claim 22, wherein the exothermic transformation takes place in the temperature range of $-5°$ C. to $20°$ C.

* * * * *